(12) United States Patent
Cole

(10) Patent No.: US 6,618,514 B1
(45) Date of Patent: Sep. 9, 2003

(54) PASSIVE PIGTAIL ATTACHMENT APPARATUS AND METHOD FOR PLANAR LIGHTWAVE CIRCUITS

(75) Inventor: Robert Cole, Mt. Hamilton, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/975,592

(22) Filed: Oct. 11, 2001

(51) Int. Cl.[7] .................................. G02B 6/12
(52) U.S. Cl. .................... 385/14; 385/49; 385/50; 385/52
(58) Field of Search ............................. 385/49, 50, 52, 385/83, 14

(56) References Cited

U.S. PATENT DOCUMENTS

| 4,639,074 A | 1/1987 | Murphy | 350/96.15 |
|---|---|---|---|
| 5,015,059 A | 5/1991 | Booth et al. | 350/96.17 |
| 5,175,781 A | 12/1992 | Hockaday et al. | 385/49 |
| 5,513,290 A | * 4/1996 | Ishikawa | 385/49 |
| 5,611,014 A | 3/1997 | Basavanhally | 385/90 |
| 5,613,024 A | 3/1997 | Shahid | 385/52 |
| 5,640,477 A | 6/1997 | Anderson | 385/49 |
| 5,784,509 A | * 7/1998 | Yamane | 385/49 |
| 5,854,867 A | 12/1998 | Lee et al. | 385/49 |
| 5,926,594 A | 7/1999 | Song et al. | 385/49 |
| 6,118,917 A | 9/2000 | Lee et al. | 385/49 |
| 6,160,936 A | 12/2000 | You et al. | 385/49 |

* cited by examiner

Primary Examiner—John Juba
Assistant Examiner—Leo Boutsikaris
(74) Attorney, Agent, or Firm—Amin & Turocy, LLP

(57) ABSTRACT

Apparatus and methods are disclosed for pigtailing optical integrated circuits, wherein optical integrated circuits (OICs) comprise a shelf upon which optical fibers are located, which provides for passive vertical alignment of fiber arrays with OIC waveguides. A cover plate with channels therein is further provided by which passive alignment in five or six alignment axes can be achieved. Also disclosed are methods for attaching fiber arrays to OICs and for manufacturing OICs.

28 Claims, 15 Drawing Sheets

PASSIVE PIGTAIL ATTACHMENT APPARATUS AND METHOD FOR PLANAR LIGHTWAVE CIRCUITS

TECHNICAL FIELD

The present invention relates to the art of optical integrated circuits and more particularly to apparatus and methods for aligning and attaching optical fibers to optical integrated circuits such as planar lightwave circuits.

Background of the Invention

Optical integrated circuits (OICs) include devices such as 1×N optical splitters, optical switches, wavelength division multiplexers (WDMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical (e.g., light) signals are transmitted. Such optical circuits include planar lightwave circuits (PLCs) having optical waveguides on flat substrates, which can be used for routing optical signals from one of a number of input optical fibers to any one of a number of output optical fibers. Optical circuits allow branching, coupling, switching, separating, multiplexing and demultiplexing optical signals without having to transform the optical signals into electrical signals first. PLCs make it possible to achieve higher densities, greater production volume and more diverse functions than are available with fiber components.

The input and output optical fibers are typically formed in a group or array of many such fibers (e.g., 48), where the fiber array is connected to a planar substrate (e.g., an integrated circuit chip) to transmit or receive light to or from waveguides in the OIC. Light from the optical fibers is then provided to optical circuitry within the OIC via the waveguides, wherein the optical circuitry may include switches, multiplexers, or other optical circuitry. The waveguides comprise optical paths deposited on the chip, which are made from glass or other transmissive media such as optical polymers, wherein the waveguides have a higher index of refraction than the chip substrate in order to guide light to or from the optical fibers in the array. The waveguide ends are commonly formed on a sidewall or edge of the optical circuit, whereat the optical fiber ends may be connected with the waveguides. The connection of optical fibers to the optical integrated circuit is sometimes referred to as "pigtailing", where an optical fiber array attached to the optical circuit appears as a pigtail.

In the pigtailing process, the ends of the optical fibers in the array must be aligned with the ends of the waveguides in the OIC, in order to ensure proper transmission of light therebetween. The alignment of the fiber array with a row of waveguides in an OIC involves relative translation of the array with respect to the OIC in six alignment axes. For example, the relative alignment is typically controlled using six axis positioning equipment and associated controls, which control linear positioning in X, Y, and Z axes, as well as rotational alignment in yaw, pitch, and roll axes. As the sizes of the waveguides and the active portions (e.g., cores) of the optical fibers continue to decrease, the alignment in the pigtailing process becomes more critical. However, such multi-axis positioning and control devices are costly, and may be difficult to operate or automate in a production environment.

Conventional techniques for such alignment and attachment include one at a time alignment and attachment of individual optical fibers, which is time consuming and not ideally suited for higher volume production of pigtailed devices. Moreover, the optical fiber array is connected to the OIC via a butt joint, which can be mechanically unstable. Some passive alignment techniques employ V-grooves etched in the substrate, in which the optical fibers may be placed for lateral alignment with the waveguides. However, inaccuracies in the lithographic and etching processes limit the applications of alignment by this methodology.

Active alignment techniques include monitoring the optical transmission of light through the waveguide/fiber interface visually while moving the optical fibers relative to the planar waveguides. In addition to visual monitoring, the transmission monitoring can be performed using a light source providing light to one or more fiber ends, and a light detector. Active alignment procedures typically produce lower loss interconnections, but result in a higher cost per interconnection than passive alignment techniques. Thus, there is a need for passive alignment and attachment techniques and apparatus, which provide the required accuracy needed for ever shrinking waveguide and optical fibers, without having to monitor the transmission during pigtailing, and without requiring complex and/or costly six axis positioning systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides optical integrated circuits (OICs) having a shelf upon which optical fibers are located, and which provides for passive vertical alignment of fiber arrays with OIC waveguides. A cover plate with channels therein is further provided by which passive alignment in five or six alignment axes can be achieved. The invention thus provides for accurate active alignment without the need for multi-axis positioning and control systems, as well as for accurate six axis passive alignment, thereby facilitating accurate and low cost pigtailing of OICs which may be easily automated for manufacturing.

One aspect of the present invention provides an optical integrated circuit (e.g., such as a PLC) with a base and one or more waveguides extending longitudinally through at least a portion of the base and having waveguide ends facing outward from a generally vertical wall in the base. A shelf is provided with a generally planar top surface extending longitudinally from the wall toward the front end of the circuit. The shelf top surface is located vertically below the waveguides by a vertical distance in order to passively align optical fibers located on the shelf with the waveguides in the vertical direction. A cover plate can then be used to hold the optical fibers on the shelf. The cover plate can have a bottom side either operable to engage the top surface of the shelf, or operable to securely trap the optical fibers between the shelf and the cover plate. The cover plate downwardly facing channels, such as V-grooves, engages the optical fibers between the channel and the top surface of the shelf, and laterally aligns the fibers with the corresponding waveguides. The shelf and cover plate cooperate to form a mechanically stable lap joint between the fiber array and the OIC.

The shelf and cover plate thus allow for five axis passive alignment, for example, with respect to Y, Z, yaw, pitch, and roll. Thereafter, the cover plate and fiber array can be translated laterally to obtain alignment along the sixth (e.g., lateral or X) axis, for example, using transmission monitoring. In addition, a vertical portion can be provided on the cover plate, such as extending vertically downward from the cover plate, which engages with a vertical abutment surface on the OIC, whereby passive alignment in the X axis can also be achieved. Thus, the invention provides for passive six axis alignment without the need for transmission monitoring, and without costly and complex six axis positioning and control equipment.

Another aspect of the invention provides pigtail attachment apparatus for an optical integrated circuit having waveguide ends in a generally vertical wall. The attachment apparatus comprises a shelf with a generally planar top surface extending longitudinally from the wall and vertically below the waveguides. The apparatus also comprises a cover plate having a bottom side with one or more downwardly facing channels to engage optical array fibers between the channel and the top surface of the shelf, for alignment thereof with the waveguides.

Yet another aspect of the invention relates to methods for attaching an optical fiber array to an optical integrated circuit having at least one waveguide with an end facing longitudinally outwardly from a generally vertical wall. The method comprises providing a shelf in a base of the optical integrated circuit, located vertically below the waveguide, and providing a cover plate having a bottom side with at least one downwardly facing channel. The method further comprises engaging an optical fiber between the downwardly facing channel and the top surface of the shelf, and securing the cover plate to the base using an adhesive or other securing techniques.

Still another aspect of the invention provides methodologies for manufacturing an optical integrated circuit, comprising fabricating a base extending longitudinally between front and rear ends, laterally between first and second sides, and vertically between a top and a bottom, and providing at least one waveguide in the base extending longitudinally through at least a portion of the base and having an end facing outward from a generally vertical wall in the base, and providing a shelf in the base with a generally planar top surface extending longitudinally from the wall toward the front end, wherein the top surface of the shelf is located vertically below the waveguide.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
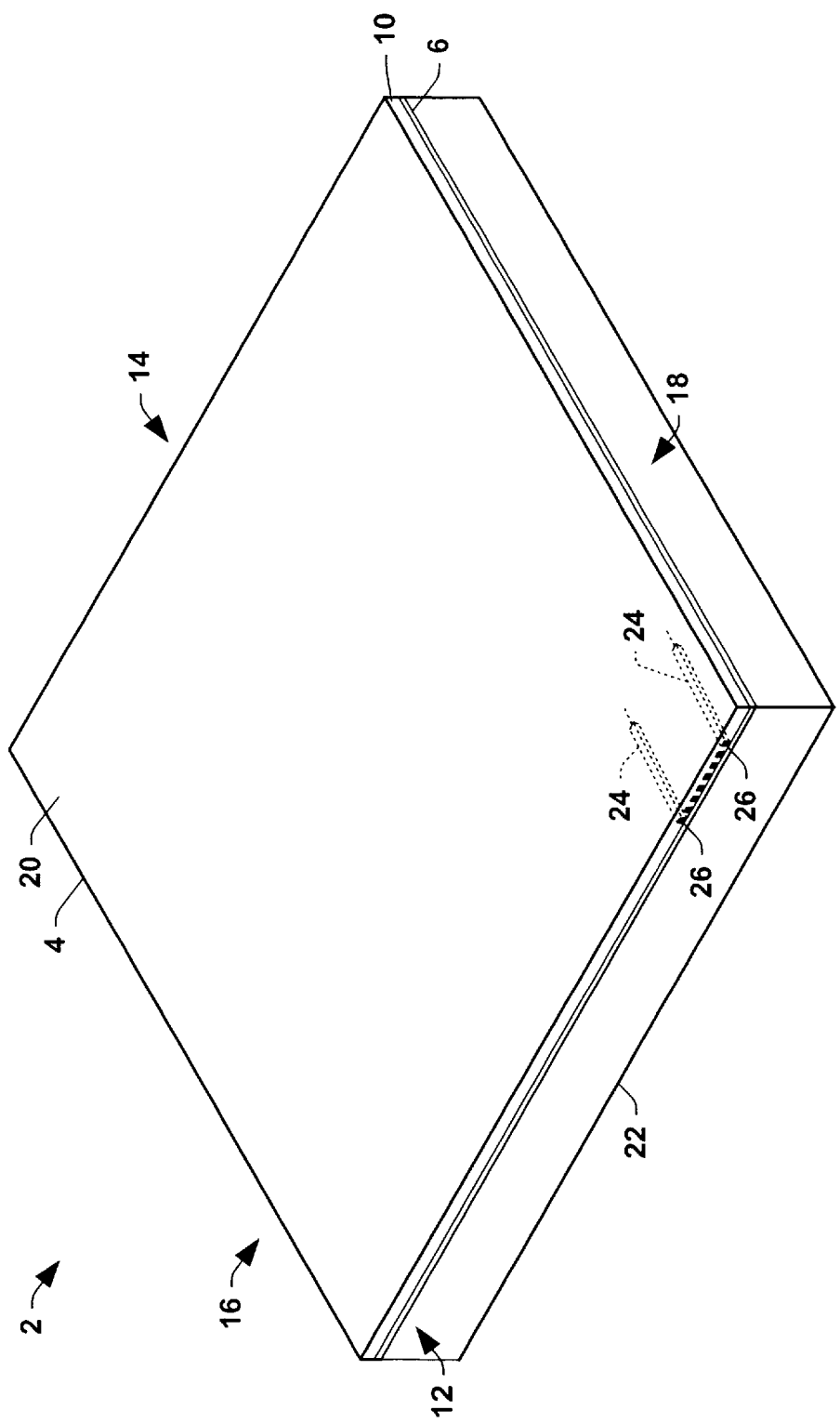
FIG. 1 is a perspective view illustrating a planar lightwave circuit with a row of waveguides.

The various aspects of the present invention will now be described with reference to the drawings, wherein like reference numerals are used to refer to like elements throughout. The invention provides optical integrated circuits (OICs) having a shelf and a cover plate between which optical fibers are located which provides for passive alignment in five or six alignment axes. In addition, the invention provides methodologies by which fiber arrays may be attached to OICs, and particularly methodologies by which optical fibers may be secured to waveguides, as well as methods for manufacturing such OICs.

In one embodiment, the waveguides and the active (e.g., core) region of the optical fibers have a cross-sectional area of about 400 $\mu m^2$ or less. In another embodiment, the waveguides and the active region of the optical fibers have a cross-sectional area of about 200 $\mu m^2$ or less, and yet another embodiment relates to waveguides and active fiber regions having cross-sectional areas of about 100 $\mu m^2$ or less.

In order to appreciate the difficulties and shortcomings associated with conventional apparatus and methodologies, FIG. 1 illustrates an optical circuit having waveguides for transmitting or receiving light signals. In particular, a planar lightwave circuit (PLC) 2 is shown having a substrate base 4 with two glass layers 6 and 10, formed thereon. The PLC 2 extends longitudinally between front and rear ends 12 and 14, and laterally between first and second sides 16 and 18, respectively, and has a top 20 and a bottom 22.

Figure 2:
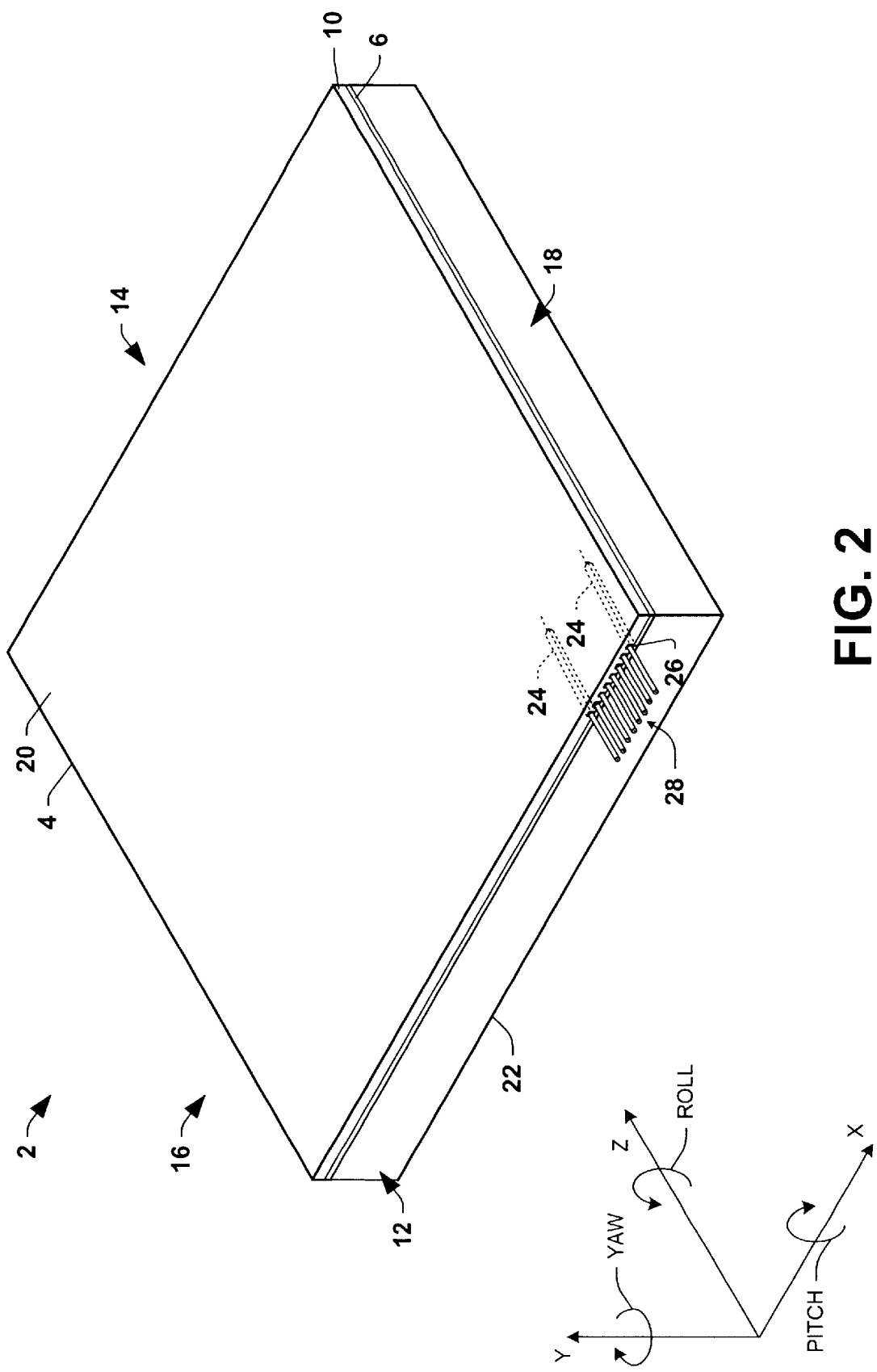
FIG. 2 is perspective view illustrating the planar lightwave circuit of FIG. 1 with an array of optical fibers aligned with the row of waveguides.

One or more waveguides 24 are formed which extend through at least a portion of the base 4. The waveguides 24 are formed of a material, such as $SiO_2$, having a higher index of refraction than the surrounding material in layers 6 and 10 in order to guide light through the waveguides 24. Referring also to FIG. 2, the waveguides 24 also include ends 26 facing longitudinally outward from the front 12 of the base 4, with which optical fibers 28 can be associated for transfer of light to or from the waveguides 24. The optical fibers are typically grouped into precisely spaced rows forming fiber arrays, wherein alignment of the array with a row of waveguide ends 26 in the PLC 2 may be performed with respect to six alignment axes X, Y, Z, pitch, yaw, and roll. Once proper alignment of the fibers 28 with the waveguide ends 26 is achieved, the fibers 28 are attached to the PLC 2, for example, optionally using an adhesive (not shown).

Figure 3:
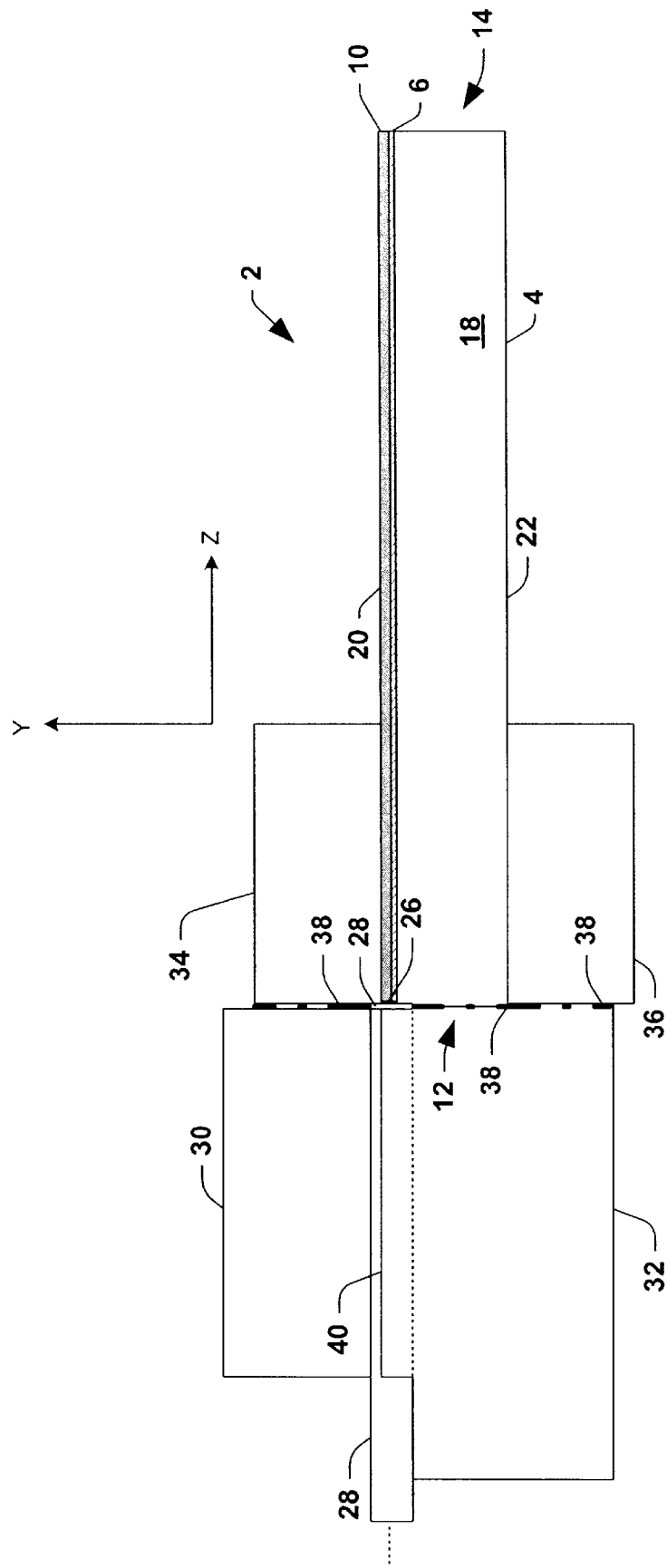
FIG. 3 is a side elevation view illustrating attachment of the optical fiber array to the planar lightwave circuit of FIGS. 1 and 2 using support pieces.
Figure 4:
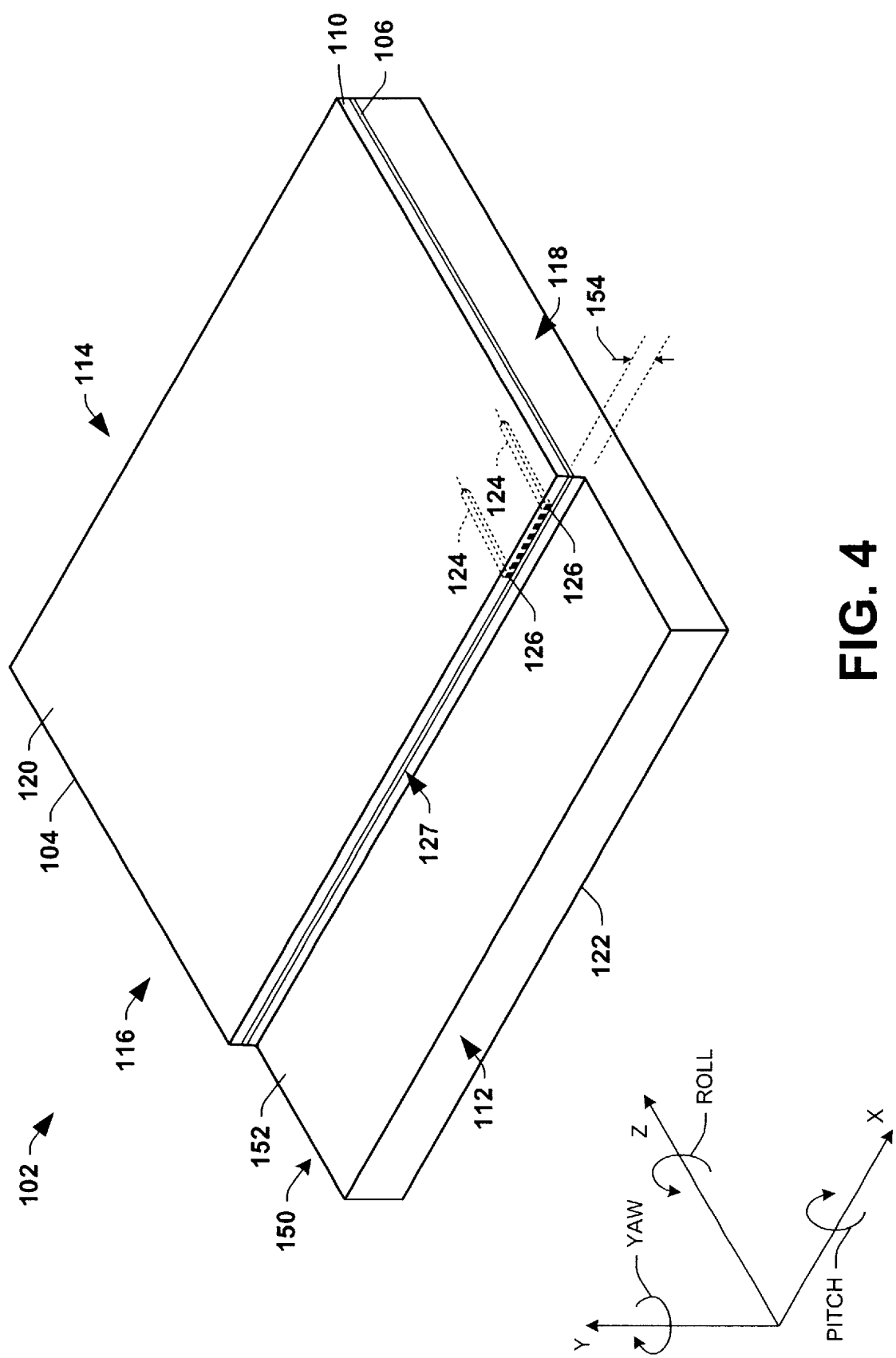
FIG. 4 is a perspective view illustrating an exemplary planar lightwave circuit having a shelf with a planar top surface in accordance with an aspect of the invention.

Referring also to FIG. 3, an array of optical fibers 28 is typically attached to the base 4 of the PLC 2 using support pieces 30, 32, 34, and 36, wherein pieces 30 and 32 engage the fibers 28 from above and below, respectively, and are attached to pieces 34 and 36 mounted on the top 20 and bottom 22, respectively, of the base 4. Adhesive 38, such as a UV curable adhesive, is used to attach support pieces 30 to 34, as well as pieces 32 to 36, and such adhesive may be optionally employed between the ends of the fibers 28 and the waveguide ends 26, wherein the index of refraction of the adhesive 38 can be matched to that of the waveguides 24. As illustrated in FIG. 3, the support pieces 30, 32, 34, and 36 are employed to provide mechanical support for the butt joint of the fibers 28 with the waveguide ends 26.

The fibers 28 may be formed into precisely spaced rows or arrays sandwiched between the upper and lower support pieces 30 and 32 prior to alignment and attachment to the PLC 2, for instance, wherein channels such as V-grooves 40 can be formed in the lower support piece 32 to provide for proper relative spacing of adjacent fibers 28 in the array. The upper and lower pieces 30 and 32 may then be joined to each other using adhesive or other appropriate means (not shown). The support pieces 34 and 36 may likewise be affixed to the top 20 and bottom 22 of the base 4 prior to the alignment optionally using adhesive (not shown).

Thereafter, six axis alignment of the active portions or cores of the optical fibers 28 is performed with respect to the ends 26 of the waveguides 24 using six axis positioning equipment and associated controls (not shown), which control linear positioning in the X, Y, and Z directions, as well as rotational alignment with respect to yaw, pitch, and roll axes. As the sizes of the waveguides and the active portions (e.g., cores) of the optical fibers continue to decrease, the importance of alignment in the pigtailing process increases. For instance, the waveguides 24 can have X and Y dimensions of from about 2 $\mu$m or more to about 10 $\mu$m or less, and the active core (not shown) of the optical fibers 28 can be about 2 $\mu$m or more to about 10 $\mu$m or less in diameter. It may thus be desirable to align the core with the waveguide 24 to within about 1 $\mu$m. However, such multi-axis positioning equipment and controls are costly, and may be difficult to operate or automate in a production environment in order to achieve the desired alignment.

The present invention provides apparatus and techniques by which five or six axis alignment can be achieved in passive fashion, without expensive multi-axis positioning equipment and controls, by which such alignment may be expedited and/or automated in a production environment. One implementation of the invention is illustrated in FIGS. 4–8, in which an exemplary planar lightwave circuit (PLC) 102 comprises a base 104 extending longitudinally between front and rear ends 112 and 114, laterally between first and second sides 116 and 118, and vertically between a top 120 and a bottom 122. Waveguides 124 extend longitudinally through at least a portion of the base 104 having ends 126 facing longitudinally outwardly from and generally perpendicular to a generally vertical wall 127 in the base 104 toward the front end 112. The waveguides 124, moreover, may be formed from an intermediate layer between layers 106 and 110 formed on the base 104, for instance, wherein the base 104 is a substrate material such as silicon, and the layers 106 and 110 are $SiO_2$, with the waveguides 124 having an index of refraction greater than that of the surrounding $SiO_2$.

According to an aspect of the invention, the PLC 102 further comprises a shelf 150 with a generally planar top surface 152 extending longitudinally from the wall 127 toward the front end 112, wherein the top surface 152 is located vertically below the row of waveguides 124 by a precisely controlled vertical distance 154, to vertically align optical fibers (not shown) therewith.

The shelf 150 may be formed in the base 104 by any appropriate techniques, including but not limited to machining, etching, polishing, or the like. For instance, it has been found that the shelf 150 may be provided by a grinding tool equipped with a camera or other optical sensing device, so as to locate the top surface 152 an appropriate vertical distance 154 below the waveguides 124, wherein vertical alignment to within about 1 $\mu$m or less can be achieved.

Figure 5:
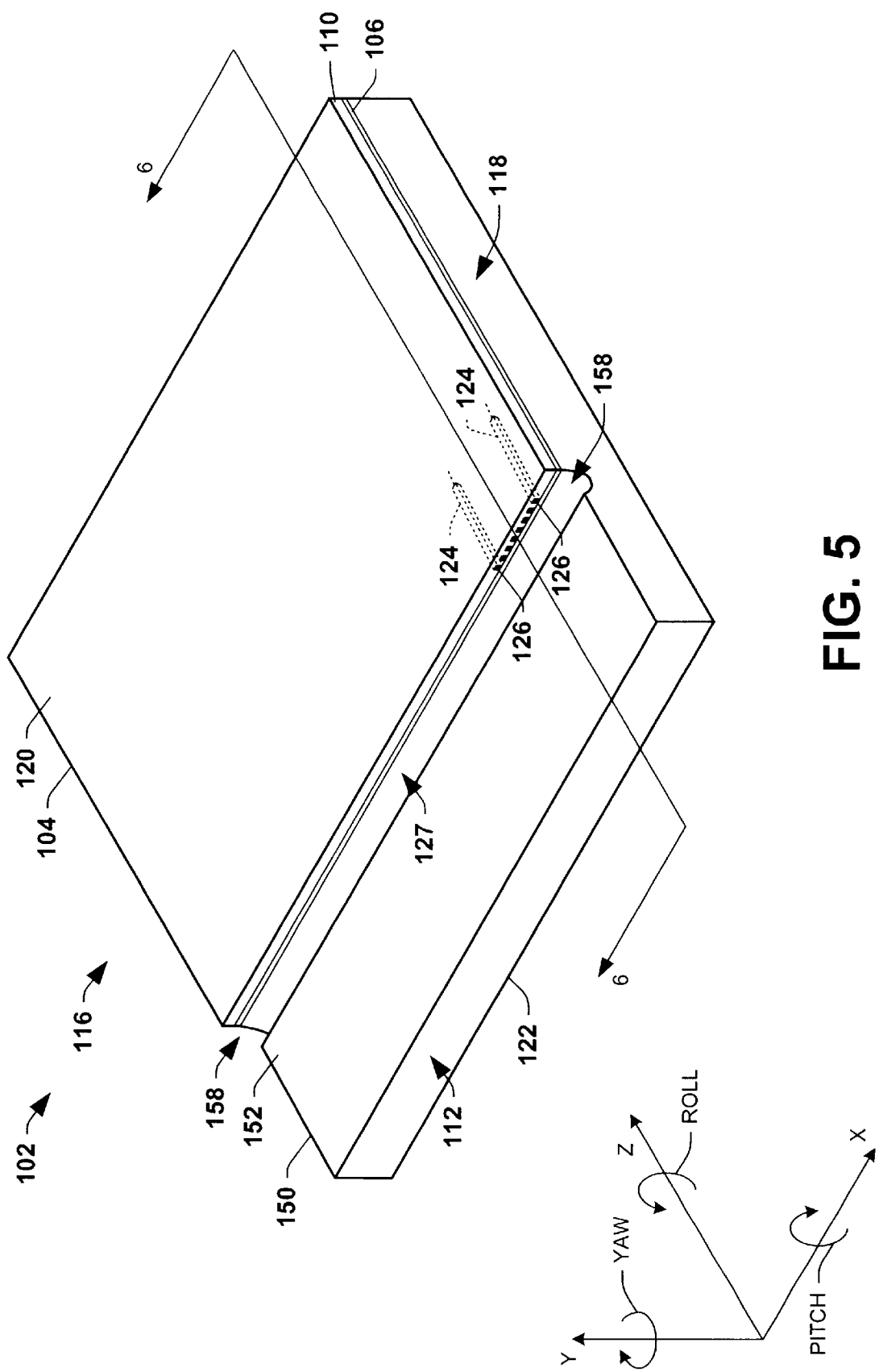
FIG. 5 is perspective view illustrating another exemplary planar lightwave circuit having a shelf and an upwardly opening channel in accordance the invention.
Figure 6:
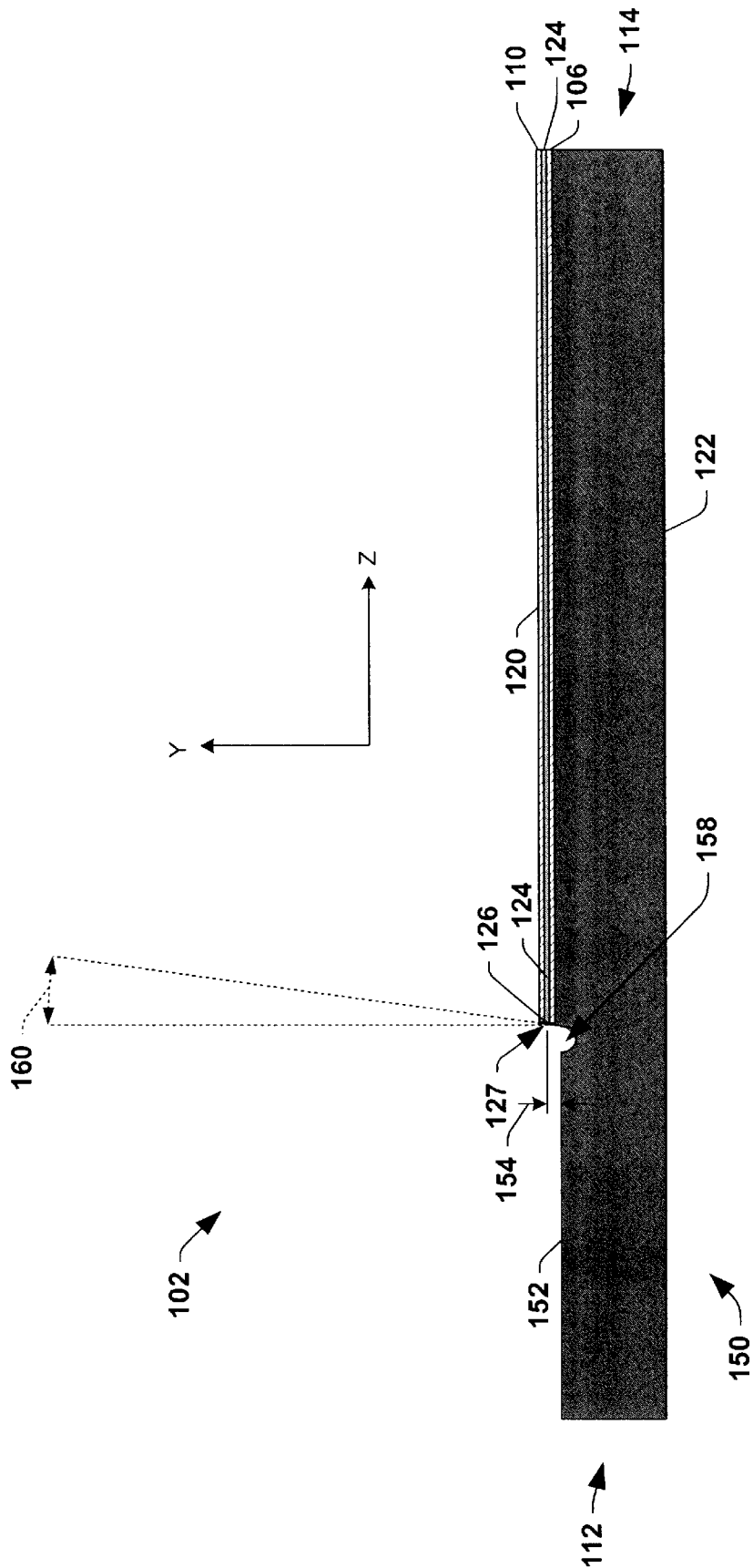
FIG. 6 is a sectional side elevation view taken along line 6—6 of FIG. 5, illustrating the planar lightwave circuit of FIG. 5.

Referring also to FIGS. 5 and 6, the base 104 may, but need not, further comprise a laterally extending upwardly opening channel 158 between the generally vertical wall 127 and the top surface 152 of the shelf 150. The wall 127 may be at a slight angle 160 (e.g., around 8 degrees) from the vertical (e.g., Y axis) in order to mitigate back propagation of reflected light from optical fibers reflecting off the wall 127 back into the fiber, wherein the channel 158 may be included in the base 104 for clearance of tooling to provide the angle 160. The channel 158 may be included regardless of whether or not the wall 127 is tilted at angle 160.

Alternatively, rather than forming wall 127 with a slight angle 160 from the vertical, wall 27 may be formed with a slight angle (not shown) in the horizontal to mitigate back reflection. In this embodiment, the PLC 102 viewed from above has a trapezoidal shape when both sides engaging optical fibers are tilted, and at least partially when one side engaging the optical fibers is tilted.

Figure 7:
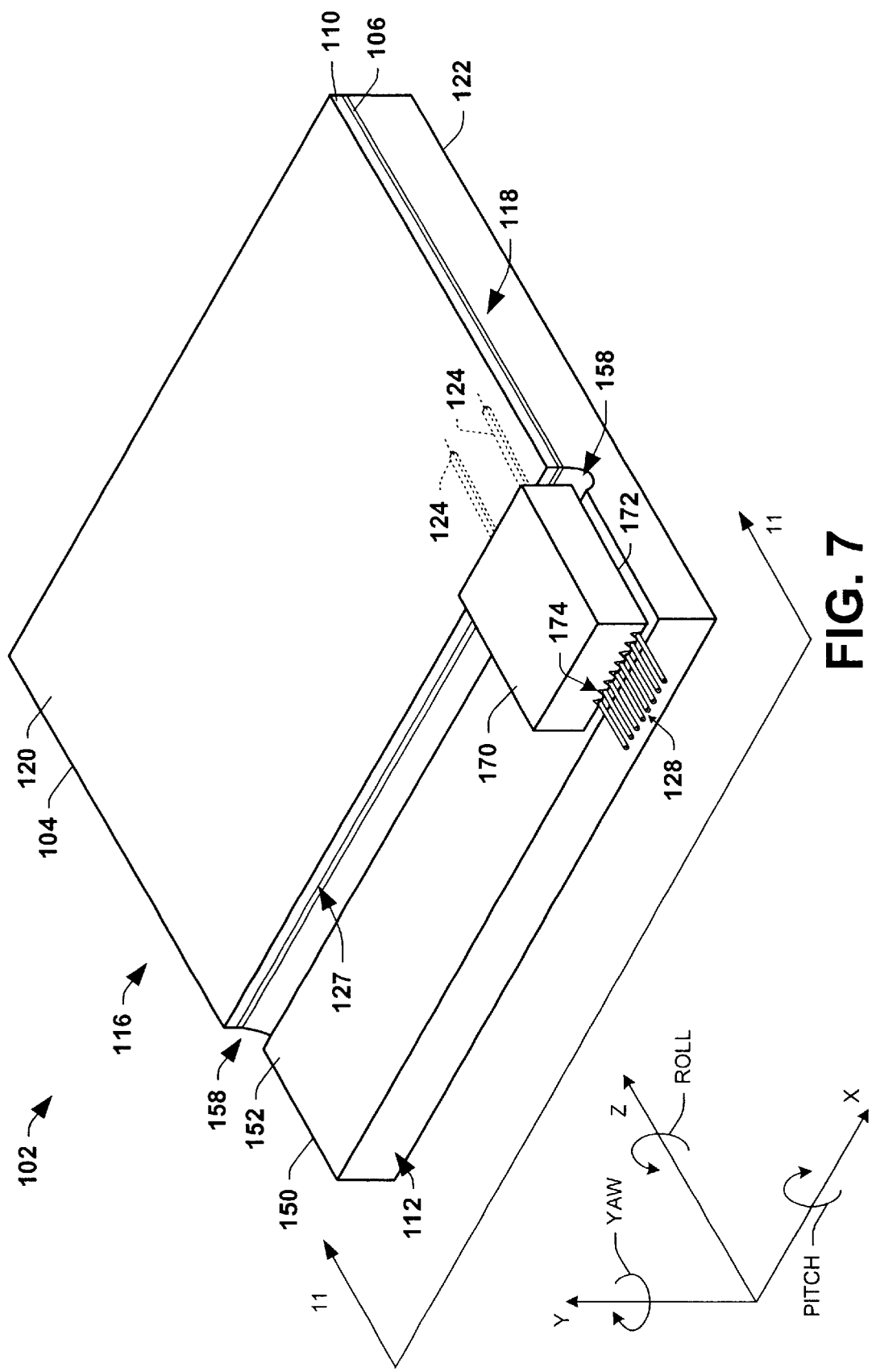
FIG. 7 is a perspective view illustrating alignment and attachment of an array of optical fibers to the planar lightwave circuit of FIGS. 5 and 6 using a cover plate with downwardly facing V-grooves in accordance with another aspect of the invention.
Figure 8:
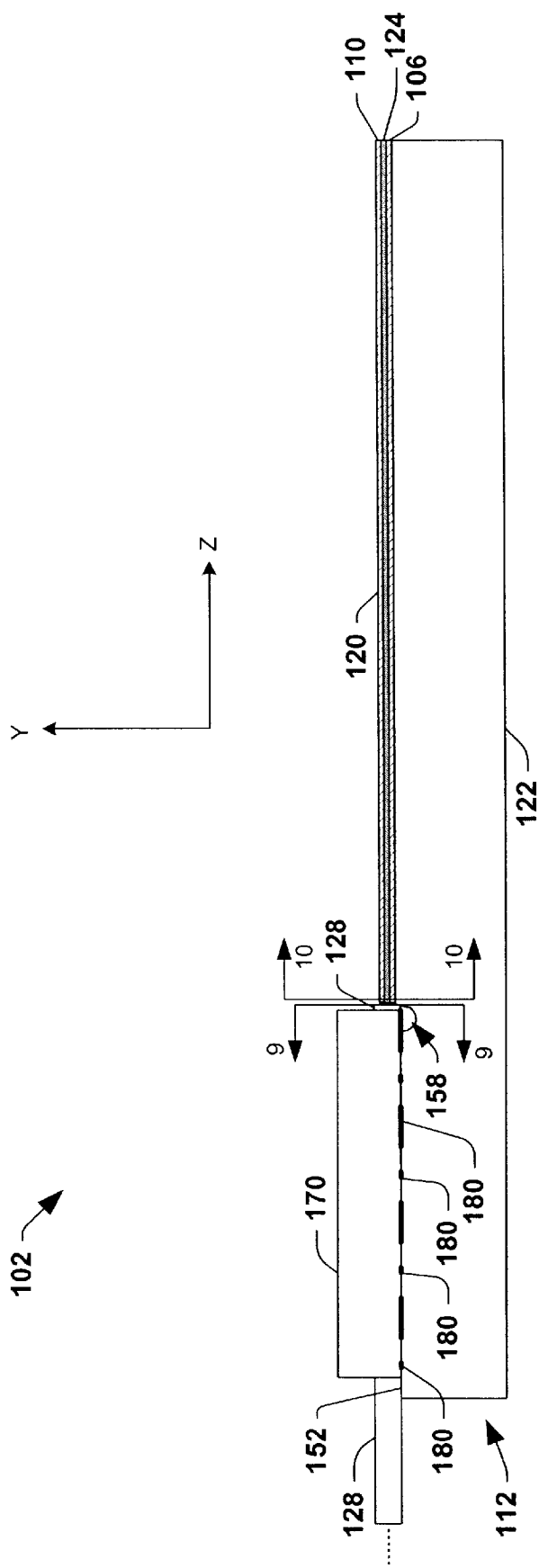
FIG. 8 is a side elevation view further illustrating the attachment of the fiber array to the planar lightwave circuit of FIGS. 5–7 in accordance with the invention.

Referring also to FIGS. 7 and 8, another aspect of the invention provides a cover plate 170 having a bottom side 172 operable to receivingly engage the top surface 152 of the shelf 150. However, as discussed in connection with FIGS. 14 and 15, cover plate 170 need not extend all the way to the shelf 150. The bottom side 172 comprises downwardly facing channels 174 operable to receivingly engage optical fibers 128 between the channels 174 and the shelf top surface 152, and to laterally align the fibers 128 with corresponding waveguides 124. That is, the downwardly facing channels 174 of the cover plate 170 are formed to maintain spacing between the fibers 128 substantially equal to the spacing of the waveguides 124. In the illustrated implementation, the channels 174 are V-grooves, however other profiles and channel shapes are contemplated as falling within the scope of the present invention. With the exception of the embodiment where the vertical wall 127 is formed with a slight angle in the horizontal or vertical, downwardly facing channels 174 are fabricated perpendicular to the front edge of the cover glass, to hold the optical fibers 128 parallel with the waveguides 124. When there is a slight angle in the vertical wall 127, downwardly facing channels 174 hold the optical fibers 128. The wall 127 is thus perpendicular to the waveguides 124 in at least one of the horizontal direction and vertical direction. In one embodiment, the wall 127 is perpendicular to the waveguides 124 in the horizontal direction but about 8 degrees off perpendicular in the vertical direction. In another embodiment, the wall 127 is perpendicular to the waveguides 124 in the vertical direction but about 8 degrees off perpendicular in the horizontal direction.

It will be noted in FIG. 7, that the engagement of the edge of the cover plate 170 with the wall 127 and the top surface 152 of the shelf 150, together with the downwardly facing channels 174 provides for passive alignment of the fibers 128 with the ends 126 of the waveguides 124 with respect to the Y, Z, yaw, pitch, and roll directions, wherein active alignment in the lateral or X direction may be achieved through lateral translation of the plate 170 and fibers 128, which may be performed in combination with transmission monitoring using a light source and a light detector (not shown). In this regard, the fibers 128 may be attached to the cover plate 170 prior to placement on the shelf 150, or alternatively, the fibers may be placed on the shelf top surface 152 before placement of the cover plate 170 thereon.

It will be further noted, that the invention finds application in association with PLCs and other optical integrated circuits having the upwardly facing channel 154, as well as with those without such a channel. Once the desired alignment has been achieved, the array of fibers 128 and/or the cover plate 170 are attached to the PLC 102 optionally by using adhesive 180, as illustrated in FIG. 8. Any appropriate adhesive may be employed, for example, including translucent UV curable adhesive. Accordingly, another advantage of the present invention is that an adhesive between the waveguides 124 (e.g., and the waveguide ends 126) and the optical fibers 128 is optional, whereas conventionally, the use of such adhesive was considered necessary. In this regard, adhesive may be employed to secure the optical fibers 128 with respect to the waveguides 124, which need not have matched refractive index. As an alternative, non-adhesive type securing techniques can be employed, for example, wherein the fibers 128 are metallized to the shelf, allowing solder connections to provide stronger mechanical joint strength.

Figure 9:
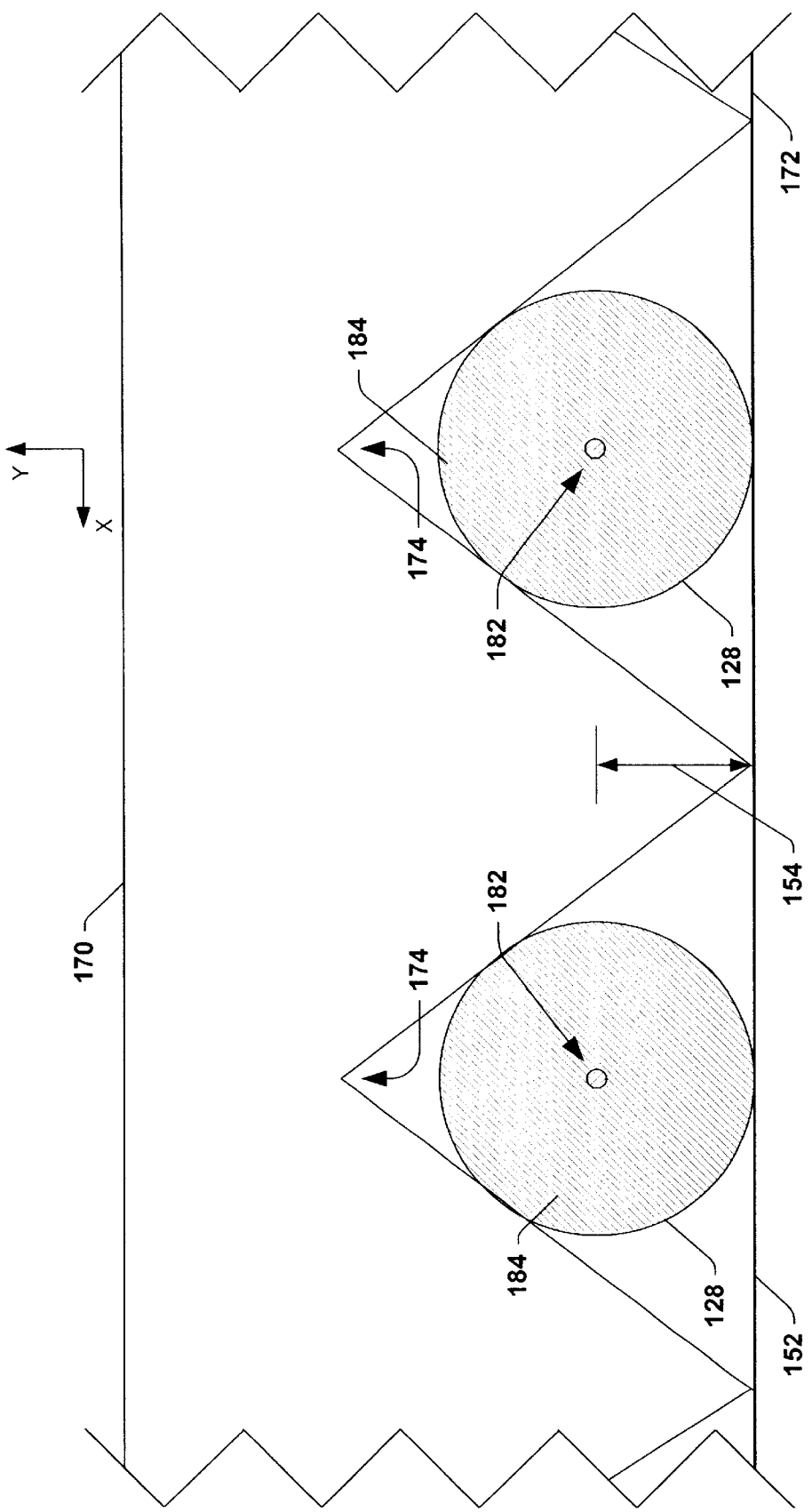
FIG. 9 is a side elevation view taken along line 9—9 of FIG. 8 illustrating a portion of the cover plate of FIGS. 7 and 8 engaging optical fibers between the V-grooves and the top surface of the shelf.
Figure 10:
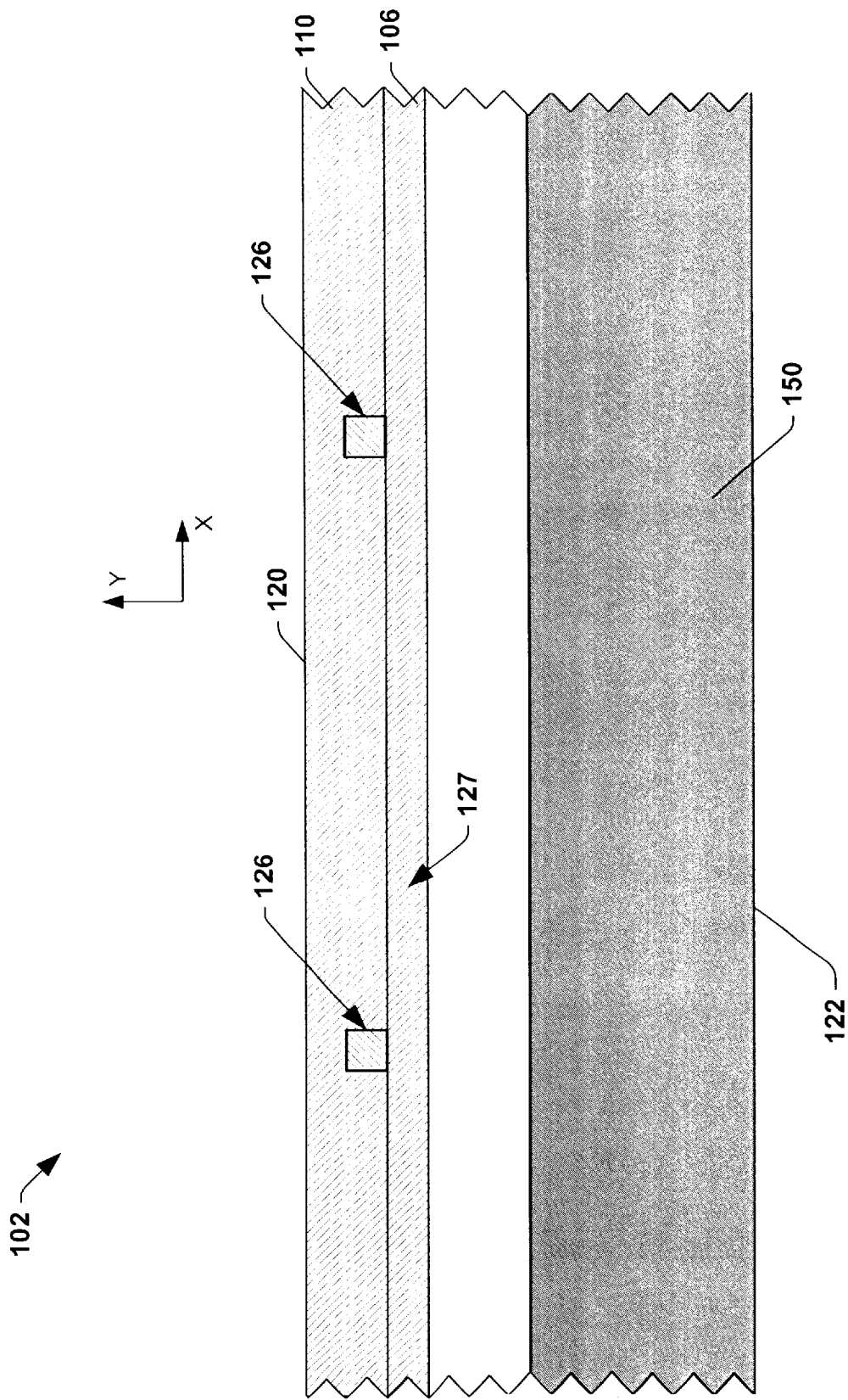
FIG. 10 is a side elevation view taken along line 10—10 of FIG. 8 illustrating a generally vertical wall in the planar lightwave circuit of FIGS. 7 and 8 having waveguide ends.
Figure 11:
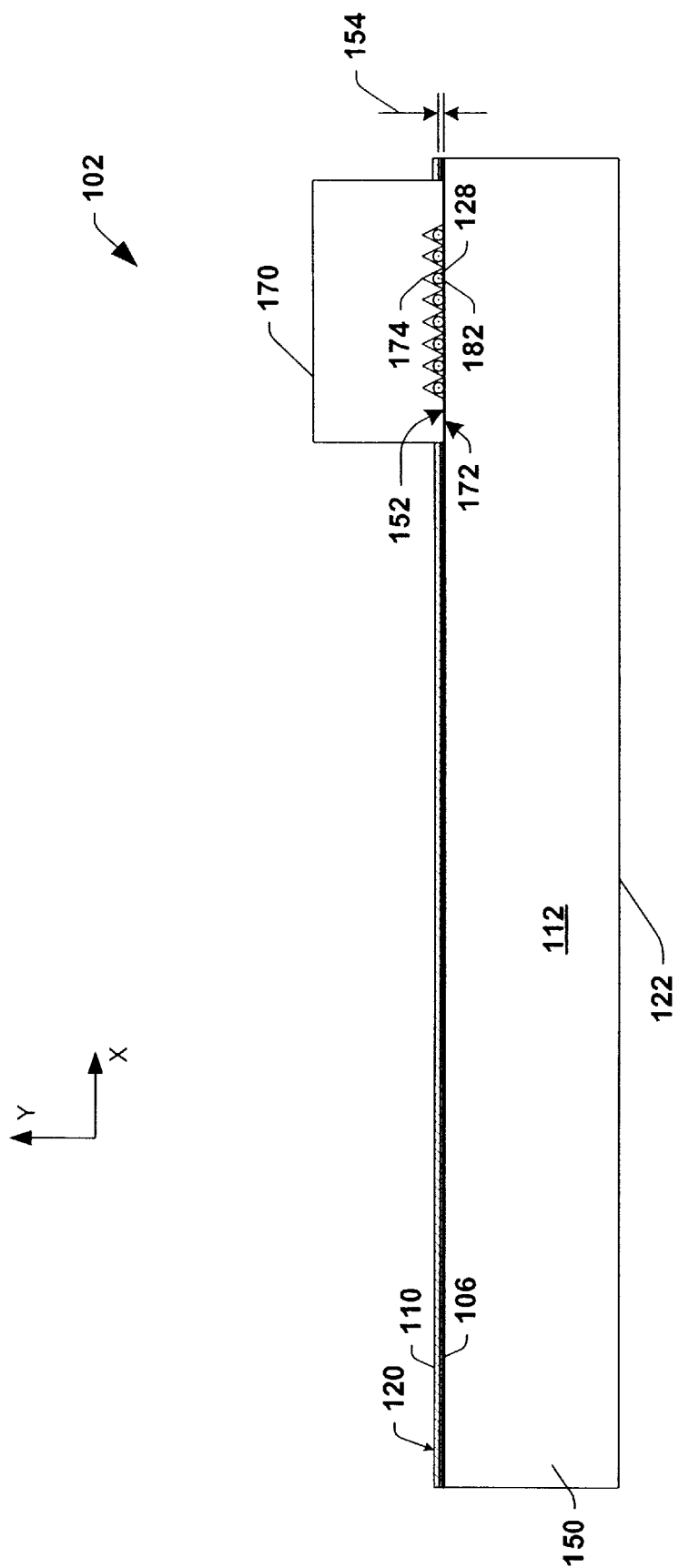
FIG. 11 is a front elevation view taken along line 11—11 of FIG. 7 further illustrating the attachment of the fiber array to the planar lightwave circuit of FIGS. 5–7 in accordance with the invention.

As illustrated in FIGS. 9 to 11, the optical fibers 128 comprise a generally circular cross-sectional profile, with an active core portion 182 generally coaxially aligned within a surrounding clad portion 184. The clad portion 184 in the exemplary implementation is about 125 $\mu$m in diameter and the core portion 182 is about 8 $\mu$m or less in diameter. The waveguides 124 and the ends 126 thereof have vertical and lateral dimensions from about 2 $\mu$m or more to about 10 $\mu$m or less. However, it will be appreciated that the various aspects of the invention may be employed in associated with other sizes and shapes of optical fibers and waveguides apart from those illustrated and described herein. The channels 174 can be shaped accordingly, in order to locate the active core portions 182 to align with the corresponding waveguide ends 126 (e.g., FIGS. 4–6) in passive fashion according to the diameter of the clad portion 184 and the waveguide lateral spacing. The bottom side 172 of the cover plate 170 can then be affixed to the shelf top surface 152, wherein the vertical distance 154 between the waveguide ends 126 and the shelf top surface 152 provides vertical alignment of the fibers 128. That is, the shelf top surface 152 in contact with the bottom of the optical fibers 128 provides vertical alignment of the fibers 128 with the waveguides 124.

Figure 12:
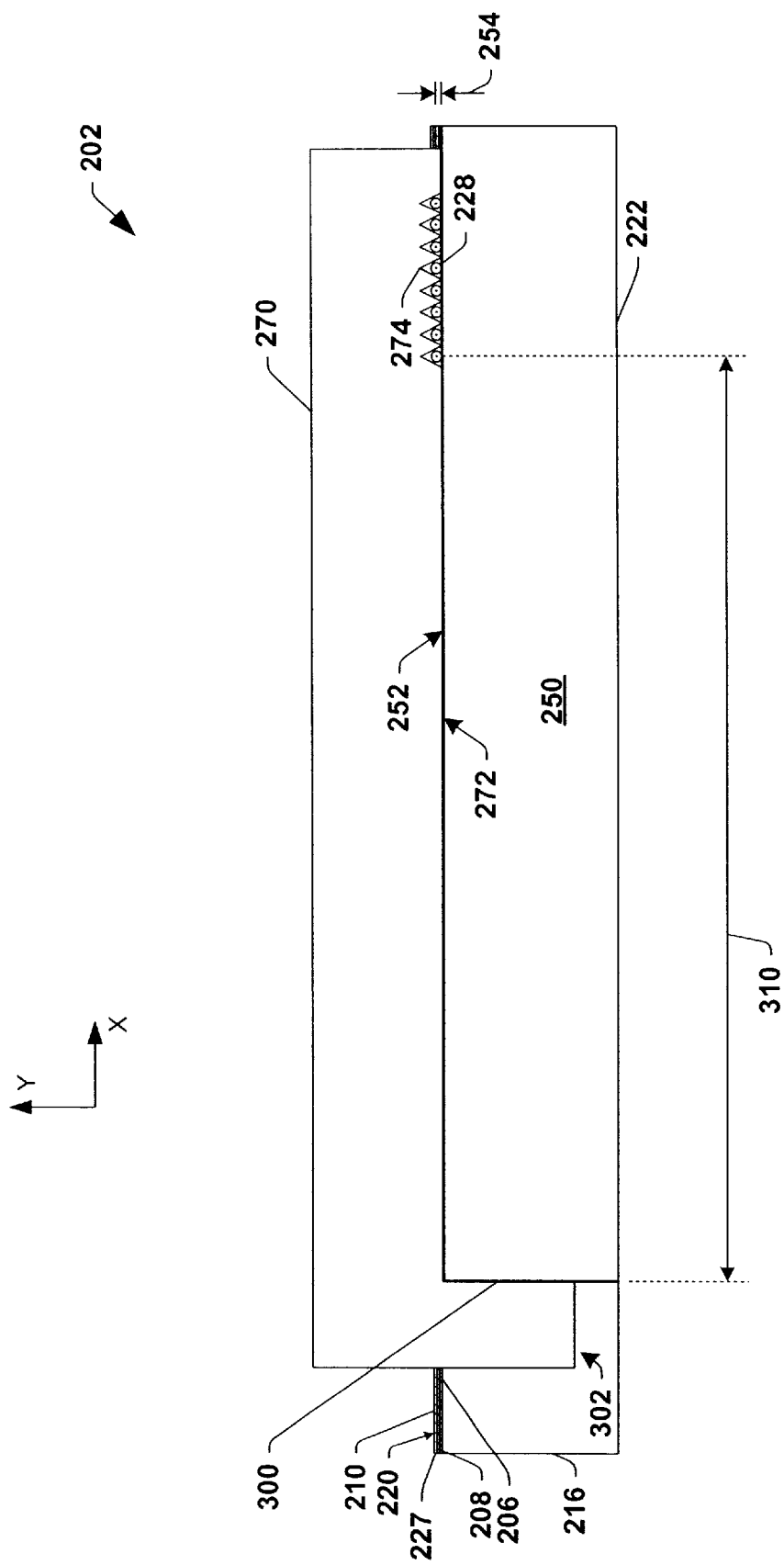
FIG. 12 is a front elevation view illustrating another exemplary planar lightwave circuit and attachment thereof with an optical fiber array in accordance with another aspect of the invention.
Figure 13:
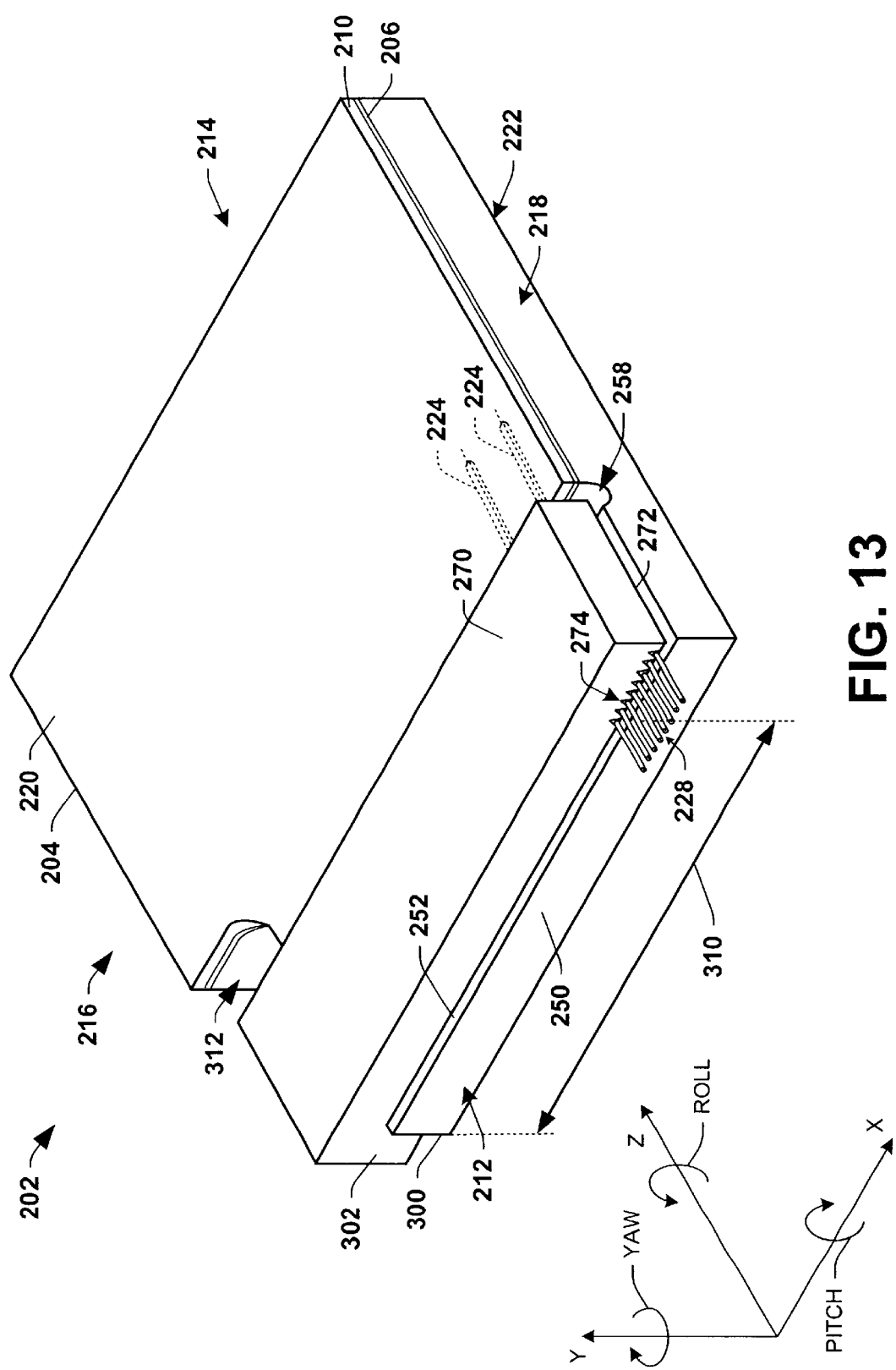
FIG. 13 is a perspective view further illustrating the planar lightwave circuit and attached optical fiber array of FIG. 12 in accordance with the invention.

Referring now to FIGS. 12 and 13, according to another aspect of the invention, the base and the cover plate can also comprise lateral alignment features allowing six axis passive alignment of optical fiber arrays with optical integrated circuits. In one implementation, an exemplary planar lightwave circuit (PLC) 202 comprises a base 204 extending longitudinally between front and rear ends 212 and 214, laterally between first and second sides 216 and 218, and vertically between a top 220 and a bottom 222. Waveguides 224 extend longitudinally through at least a portion of the base 204 having ends (not shown) facing longitudinally outwardly from a generally vertical wall 227 in the base 204 toward the front end 212 in similar fashion to the waveguide ends 126 of wall 127 of FIGS. 4–6 above. The waveguides 224, moreover, may be formed in an intermediate layer 208 located between layers 206 and 210 formed on the base 204.

The PLC 202 further comprises a shelf 250 with a generally planar top surface 252 extending longitudinally from the wall 227 toward the front end 212, wherein the top surface 252 is located vertically below the row of waveguides 224 by a vertical distance 254, to vertically align optical fibers 228 therewith. The shelf 250 may be formed in the base 204 by any appropriate techniques, including but not limited to machining, grinding, etching, polishing, or the like. For instance, the shelf 250 may be provided by a grinding tool equipped with a camera or other optical sensing device (not shown), so as to locate the top surface 252 an appropriate vertical distance 254 below the waveguides 224, wherein vertical alignment to within about 1 $\mu$m or less can be achieved.

The base 204 may, but need not, further comprise a laterally extending upwardly opening channel 258 between the generally vertical wall 227 and the top surface 252 of the shelf 250. The wall 227 may be at a slight angle (e.g., around 8 degrees) from the vertical (e.g., Y axis) in order to mitigate back propagation of reflected light from optical fibers reflecting off the wall 227 back into the fiber, wherein the channel 258 may be included in the base 204 for clearance of tooling to provide the angle. A cover plate 270 is provided, having a bottom side 272 either operable to receivingly engage the top surface 252 of the shelf 250 (shown) or operable to trap the optical fibers 228 between the shelf 250 and the bottom side 272 without the bottom side 272 contacting the shelf 250 (for instance, see FIG. 14). The bottom side 272 comprises downwardly facing channels 274 (e.g., V-grooves or other shaped channels) operable to receivingly engage optical fibers 228 between the channels 274 and the shelf top surface 252, and to laterally align the fibers 228 with corresponding waveguides 224.

The engagement of the edge of the cover plate 270 with the wall 227 and keeping the fibers 228 in contact with the shelf 250, the downwardly facing channels 274 provides for passive alignment of the fibers 228 with the ends of the waveguides 224 with respect to the Y, Z, yaw, pitch, and roll directions. The exemplary base 204 further comprises a longitudinally extending generally vertical abutment feature 300 operative to receivingly engage a vertical portion 302 of the cover plate 270, wherein the vertical portion 302 extends downwardly from the cover plate 270 so as to engage with the abutment feature 300 in order to laterally align the optical fibers 228 with the waveguides 224.

At least one of the downwardly facing channels 274 in the bottom 272 of the cover plate 270 is laterally spaced from the vertical portion 302 in the cover plate 270 by a lateral distance 310. In addition, the vertical abutment feature 300 is laterally spaced from the corresponding waveguide 224 in the base 204 by the lateral distance 310 in order to laterally align the optical fibers 228 with the waveguides when the vertical portion 302 engages the abutment feature 300. The vertical abutment feature 300 can be provided in the base 204 in any fashion, such as by machining a notch 312 out of the first end 216 of the base 204. Any form of abutment feature in the PLC 202 and corresponding vertical portion in the cover plate 270 may be employed, whereby lateral alignment can be achieved within the scope of the present invention, in addition to those illustrated and described herein.

Figure 14:
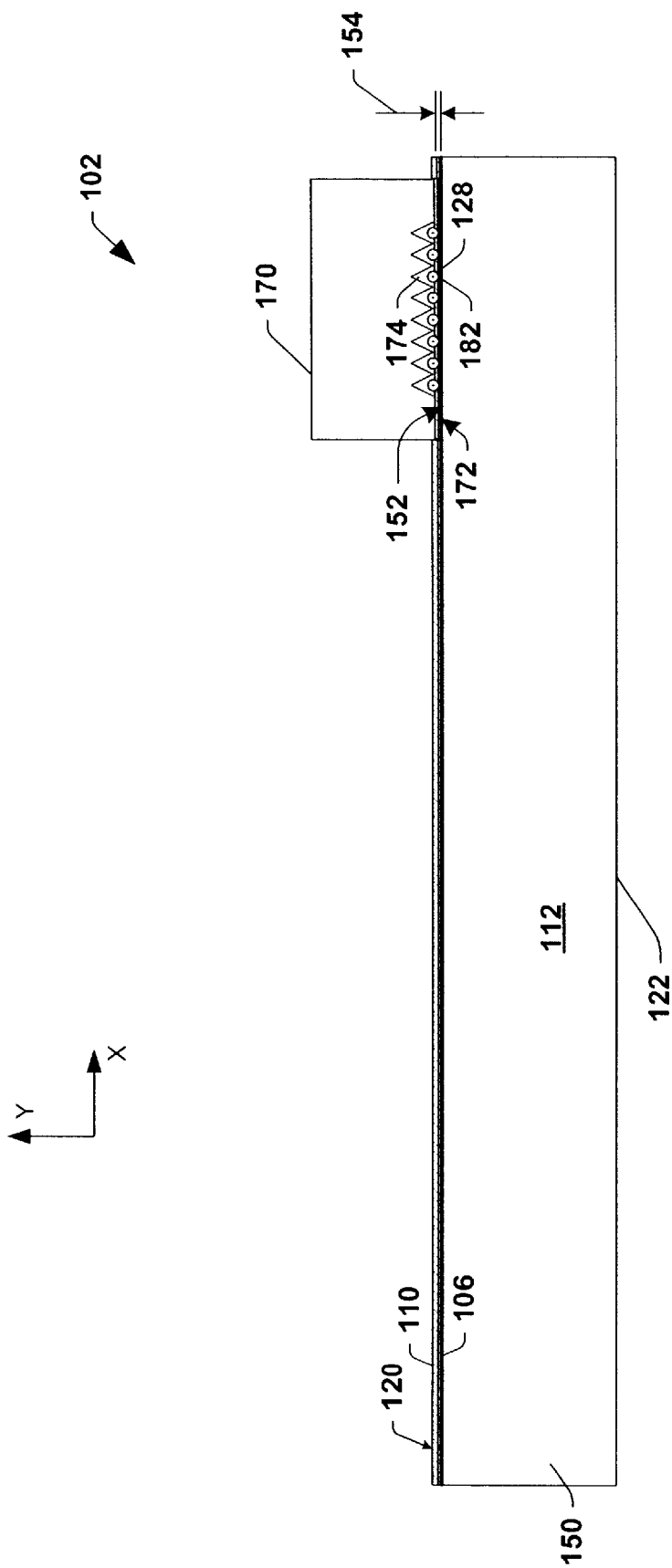
FIG. 14 is a front elevation view further illustrating the another embodiment of attachment of the fiber array to the planar lightwave circuit in accordance with the invention.
Figure 15:
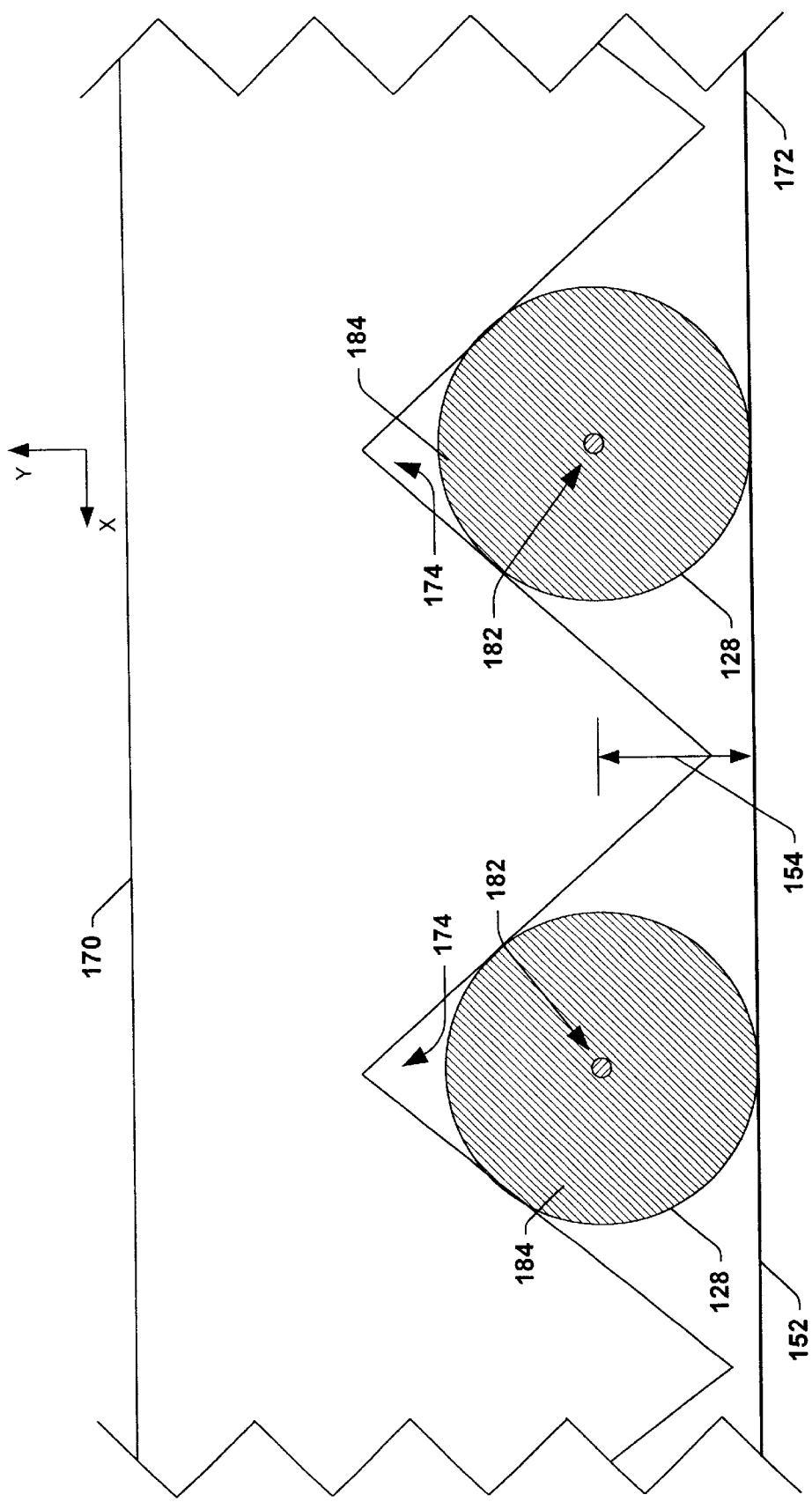
FIG. 15 is a side elevation view taken along line close up view of FIG. 14 illustrating a portion of the cover plate engaging optical fibers between the V-grooves and the top surface of the shelf.

As illustrated in FIGS. 14 and 15, the optical fibers 128 comprise a generally circular cross-sectional profile, with an active core portion 182 generally coaxially aligned within a surrounding clad portion 184. The channels 174 can be shaped accordingly, in order to locate the active core portions 182 to align with the corresponding waveguide ends 126 (e.g., FIGS. 4–6) in passive fashion according to the diameter of the clad portion 184 and the waveguide lateral spacing. The bottom side 172 of the cover plate 170 does not contact the shelf top surface 152, but traps the optical fibers against the shelf top surface 152. The shelf top surface 152 provides vertical alignment of the fibers 128 to the waveguide ends 126. That is, the shelf top surface 152 in contact with the bottom of the optical fibers 128 provides vertical alignment of the fibers 128 with the waveguides 124. an adhesive or solder can be present in the space between the shelf top surface 152 and bottom side 172 of the cover plate 170.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", with, "has", "having", and variants thereof are used in either the detailed description or the claims, these terms are intended to be inclusive in a manner similar to the term "comprising."

what is claimed is:

1. A planar lightwave circuit, comprising:
    a base extending longitudinally between front and rear ends, laterally between first and second sides, and vertically between a top and a bottom;
    at least one waveguide extending longitudinally through at least a portion of the base and having an end facing the front end through a generally vertical wall in the base; and
    a shelf with a planar top surface extending longitudinally from the generally vertical wall toward the front end, wherein the top surface of the shelf is located vertically below the at least one waveguide.

2. The planar lightwave circuit of claim 1, further comprising a cover plate having a bottom side positioned at least partially above the top surface of the shelf, wherein the bottom side comprises at least one downwardly facing channel operable to receivingly engage an optical fiber between the downwardly facing channel and the top surface of the shelf, and to laterally align the optical fiber with the at least one waveguide.

3. The planar lightwave circuit of claim 2, wherein the top surface of the shelf is located vertically below the at least one waveguide by a vertical distance to vertically align the optical fiber with the at least one waveguide.

4. The planar lightwave circuit of claim 3, comprising a plurality of waveguides extending longitudinally through the base and having ends facing the front end through the generally vertical wall in the base, wherein the bottom side of the cover plate comprises a plurality of downwardly facing channels operable to receivingly engage a plurality of optical fibers between the channels and the top surface of the shelf, and to laterally align the optical fibers with the plurality of waveguides.

5. The planar lightwave circuit of claim 4, wherein the base comprises a longitudinally extending generally vertical abutment feature operative to receivingly engage a vertical portion of the cover plate, and wherein the cover plate comprises a vertical portion extending downwardly so as to engage with the abutment feature in order to laterally align the plurality of optical fibers with the plurality of waveguides.

6. The planar lightwave circuit of claim 5, wherein the base comprises a laterally extending upwardly opening channel between the generally vertical wall and the top surface of the shelf.

7. The planar lightwave circuit of claim 5, wherein the at least one downwardly facing channel in the cover plate comprises a V-groove operable to receivingly engage an optical fiber between the channel and the top surface of the shelf, and to laterally align the fiber with the at least one waveguide.

8. The planar lightwave circuit of claim 1, wherein the base comprises a laterally extending upwardly opening channel between the generally vertical wall and the top surface of the shelf.

9. The planar lightwave circuit of claim 2, wherein the base comprises a longitudinally extending generally vertical abutment feature operative to receivingly engage a vertical portion of the cover plate, and wherein the cover plate comprises a vertical portion extending downwardly so as to engage with the abutment feature in order to laterally align the optical fiber with the at least one waveguide.

10. The planar lightwave circuit of claim 1, wherein the top surface of the shelf is located vertically below the at least one waveguide by a vertical distance to vertically align the optical fiber with the at least one waveguide.

11. The planar lightwave circuit of claim 2, wherein the at least one downwardly facing channel in the cover plate comprises a V-groove operable to receivingly engage an optical fiber between the channel and the top surface of the shelf, and to laterally align the optical fiber with the at least one waveguide.

12. The planar lightwave circuit of claim 1, wherein the generally vertical wall is positioned perpendicular to the at least one waveguide horizontally and about 8 degrees from perpendicular to the at least one waveguide vertically.

13. The planar lightwave circuit of claim 1, wherein the generally vertical wall is positioned perpendicular to the at least one waveguide vertically and about 8 degrees from perpendicular to the at least one waveguide horizontally.

14. A pigtail attachment apparatus for an optical integrated circuit having a base and at least one waveguide extending longitudinally through at least a portion of the base and having an end facing longitudinally outwardly from a generally vertical wall toward a front end of the base, the pigtail attachment comprising:
a shelf with a generally planar top surface extending longitudinally from the wall toward the front end, wherein the top surface of the shelf is located vertically below the at least one waveguide; and
a cover plate having a bottom side comprising at least one downwardly facing channel operable to receivingly engage an optical fiber between the channel and the top surface of the shelf, and to laterally align the optical fiber with the at least one waveguide.

15. The apparatus of claim 14, wherein the top surface of the shelf is located vertically below the at least one waveguide by a vertical distance to vertically align the optical fiber with the at least one waveguide.

16. The apparatus of claim 14, wherein the base comprises a plurality of waveguides extending longitudinally through at least a portion of the base and having ends facing longitudinally outwardly from the generally vertical wall in the base toward the front end, and wherein the bottom side of the cover plate comprises a plurality of downwardly facing channels operable to receivingly engage a plurality of optical fibers between the channels and the top surface of the shelf, and to laterally align the optical fibers with the plurality of waveguides.

17. The apparatus of claim 14, wherein the base comprises a longitudinally extending generally vertical abutment feature operative to receivingly engage a vertical portion of the cover plate, and wherein the cover plate comprises a vertical portion operative to engage with the abutment feature in order to laterally align the optical fiber with the at least one waveguide.

18. The apparatus of claim 17, wherein the at least one downwardly facing channel is laterally spaced from the vertical portion in the cover plate by a lateral distance, and wherein the generally vertical abutment feature is laterally spaced from the at least one waveguide in the base by the lateral distance in order to laterally align the optical fiber with the at least one waveguide when the vertical portion engages the abutment feature.

19. The apparatus of claim 14, wherein the shelf comprises a laterally extending upwardly opening channel between the generally vertical wall and the top surface of the shelf.

20. The apparatus of claim 14, wherein the at least one downwardly facing channel in the cover plate comprises a V-groove operable to receivingly engage the optical fiber between the channel and the top surface of the shelf, and to laterally align the optical fiber with the at least one waveguide.

21. The apparatus of claim 14, wherein the end of the at least one waveguide and a core region of the optical fiber have a cross-sectional area of about 400 $\mu m^2$ or less.

22. A method of attaching an optical fiber array to an optical integrated circuit having at least one waveguide with an end facing longitudinally outwardly from a generally vertical wall, the method comprising:
providing a shelf in a base of the optical integrated circuit, wherein the shelf comprises a planar top surface extending longitudinally from the wall, wherein the top surface of the shelf is located vertically below the at least one waveguide;
providing a cover plate having a bottom side with at least one downwardly facing channel;
engaging an optical fiber between the at least one downwardly facing channel and the top surface of the shelf; and
securing the cover plate to the base.

23. The method of claim 22, further comprising laterally aligning the optical fiber with the at least one waveguide prior to attaching the cover plate to the base.

24. The method of claim 23, wherein laterally aligning the optical fiber with the at least one waveguide comprises:
providing a vertical abutment surface in the optical integrated circuit; providing a vertical portion extending downward from the top surface of the cover plate; and
engaging the vertical abutment surface with the vertical portion of the cover plate so as to laterally align the optical fiber with the at least one waveguide.

25. The method of claim 22, wherein the end of the at least one waveguide and an active region of the optical fiber have a cross-sectional area of about 200 $\mu m^2$ or less.

26. A method of manufacturing an optical integrated circuit, comprising:
fabricating a base extending longitudinally between front and rear ends, laterally between first and second sides, and vertically between a top and a bottom;
providing at least one waveguide in the base extending longitudinally through at least a portion of the base and having an end longitudinally facing the front end from a generally vertical wall in the base; and
providing a shelf in the base with a planar top surface extending longitudinally from the wall toward the front end, wherein the top surface of the shelf is located vertically below the at least one waveguide.

27. The method of claim 26, further comprising:
providing a cover plate having a bottom side operable to receivingly engage the top surface of the shelf, wherein the bottom side comprises at least one downwardly facing channel; and
engaging an optical fiber between the channel and the top surface of the shelf in order to laterally align the fiber with the at least one waveguide.

28. The method of claim 27, wherein providing a shelf in the base comprises locating the top surface of the shelf vertically below the at least one waveguide by a vertical distance to vertically align the fiber with the at least one waveguide.

* * * * *